(12) United States Patent
Scarlett

(10) Patent No.: US 11,933,718 B2
(45) Date of Patent: Mar. 19, 2024

(54) CIRCULAR BIREFRINGENCE IDENTIFICATION OF MATERIALS

(71) Applicant: Carol Y. Scarlett, Tallahassee, FL (US)

(72) Inventor: Carol Y. Scarlett, Tallahassee, FL (US)

(*) Notice: Subject to any disclaimer, the term of this patent is extended or adjusted under 35 U.S.C. 154(b) by 0 days.

(21) Appl. No.: 16/687,319

(22) Filed: Nov. 18, 2019

(65) Prior Publication Data
US 2020/0088630 A1 Mar. 19, 2020

Related U.S. Application Data

(63) Continuation of application No. 15/435,246, filed on Feb. 16, 2017, now abandoned.
(Continued)

(51) Int. Cl.
*G01N 21/23* (2006.01)
*G01N 21/03* (2006.01)
(Continued)

(52) U.S. Cl.
CPC .......... *G01N 21/23* (2013.01); *G01N 21/031* (2013.01); *G01N 21/19* (2013.01); *G01N 21/255* (2013.01);
(Continued)

(58) Field of Classification Search
CPC ...... G01N 21/23; G01N 21/031; G01N 21/19; G01N 21/255; G01N 21/27; G01N 21/31;
(Continued)

(56) References Cited

U.S. PATENT DOCUMENTS

| | | |
|---|---|---|
| 3,432,221 A | 3/1969 | Harris et al. |
| 3,540,427 A | 11/1970 | Anderson |

(Continued)

FOREIGN PATENT DOCUMENTS

| | | |
|---|---|---|
| WO | WO-03023409 A2 | 3/2003 |
| WO | WO-2004068191 A2 | 8/2004 |

(Continued)

OTHER PUBLICATIONS

Müller et al., Cavity ring-down polarimetry (CRDP): theoretical and experimental characterization, J. Opt. Soc. Am. B, 19(1):125-141 (Jan. 2002).
(Continued)

*Primary Examiner* — Violeta A Prieto
(74) *Attorney, Agent, or Firm* — MARSHALL, GERSTEIN & BORUN LLP

(57) ABSTRACT

An optical system uses a sample medium disposed within an optical cavity, receives an input beam that may be non-coherent or coherent, and produces an optical energy from the input beam, by creating birefringent-induced beam components each cavity traversal, forming a mixed quantum state beam for the input beam. The mixed quantum state beam exits the cavity, and the energy distribution of the exiting beam is analyzed over a range of tuned input beam frequencies to uniquely identify circularly birefringent the materials within the sample medium, e.g., amino acids, proteins, or other circular birefringent molecules, biological or otherwise.

12 Claims, 10 Drawing Sheets

Related U.S. Application Data

(60) Provisional application No. 62/427,394, filed on Nov. 29, 2016.

(51) Int. Cl.
| | | |
|---|---|---|
| *G01N 21/19* | (2006.01) | |
| *G01N 21/25* | (2006.01) | |
| *G01N 21/27* | (2006.01) | |
| *G01N 21/31* | (2006.01) | |
| *G02F 1/137* | (2006.01) | |

(52) U.S. Cl.
CPC ............. *G01N 21/27* (2013.01); *G01N 21/31* (2013.01); *G02F 1/137* (2013.01)

(58) Field of Classification Search
CPC ...... G01N 2021/1727; G01N 2021/391; G02F 1/137
See application file for complete search history.

(56) References Cited

U.S. PATENT DOCUMENTS

| | | | |
|---|---|---|---|
| 3,831,108 A | | 8/1974 | Le Floch |
| 4,205,268 A | | 5/1980 | Eerkens |
| 4,222,668 A | | 9/1980 | Henry |
| 4,305,046 A | | 12/1981 | Le Floch et al. |
| 4,327,337 A | | 4/1982 | Liu |
| 4,449,825 A | | 5/1984 | May |
| 4,467,032 A | | 8/1984 | Lowke et al. |
| 4,718,766 A | * | 1/1988 | Greenstein ............. G01C 19/66 356/472 |
| 4,797,893 A | | 1/1989 | Dixon |
| 4,798,952 A | | 1/1989 | Fink |
| 4,812,767 A | | 3/1989 | Taketomi |
| 4,907,235 A | | 3/1990 | Kuizenga |
| 5,121,245 A | | 6/1992 | Johnson |
| 5,142,548 A | | 8/1992 | Krasinski et al. |
| 5,233,624 A | | 8/1993 | LaPlante et al. |
| 5,272,708 A | | 12/1993 | Esterowitz et al. |
| 5,276,695 A | | 1/1994 | Scheps |
| 5,289,114 A | * | 2/1994 | Nakamura ............. G01R 15/22 324/96 |
| 5,355,381 A | * | 10/1994 | Leilabady ............ H01Q 3/2676 372/23 |
| 5,359,621 A | | 10/1994 | Tsunoda et al. |
| 5,946,090 A | | 8/1999 | Tashiro et al. |
| 5,982,174 A | | 11/1999 | Wagreich et al. |
| 6,097,488 A | | 8/2000 | Grek et al. |
| 6,370,168 B1 | | 4/2002 | Spinelli |
| 6,614,828 B1 | | 9/2003 | Basting et al. |
| 6,687,012 B2 | | 2/2004 | Sanzari |
| 7,081,952 B2 | | 7/2006 | Kim et al. |
| 7,535,938 B2 | | 5/2009 | Luo et al. |
| 7,800,751 B1 | | 9/2010 | Silver et al. |
| 7,817,325 B1 | | 10/2010 | Uchikawa et al. |
| 7,991,028 B1 | | 8/2011 | Bruno |
| 8,345,248 B2 | | 1/2013 | Hong et al. |
| 8,564,783 B2 | | 10/2013 | Flanders et al. |
| 9,488,569 B2 | | 11/2016 | Scarlett |
| 9,702,812 B2 | * | 7/2017 | Rakitzis .................... G01J 4/02 |
| 9,903,805 B2 | * | 2/2018 | Rakitzis ................. G01N 21/19 |
| 9,971,568 B2 | | 5/2018 | Scarlett |
| 2002/0009123 A1 | | 1/2002 | Medlock |
| 2002/0171905 A1 | | 11/2002 | Liu et al. |
| 2004/0131092 A1 | | 7/2004 | Nakayama et al. |
| 2004/0178348 A1 | | 9/2004 | Wainer et al. |
| 2005/0036534 A1 | | 2/2005 | Baney |
| 2005/0270439 A1 | | 12/2005 | Weber et al. |
| 2007/0047600 A1 | | 3/2007 | Luo et al. |
| 2007/0064748 A1 | | 3/2007 | Mirov et al. |
| 2007/0211449 A1 | | 9/2007 | Holman et al. |
| 2007/0285669 A1 | | 12/2007 | Ajgaonkar et al. |
| 2009/0290167 A1 | | 11/2009 | Flanders et al. |
| 2010/0231911 A1 | | 9/2010 | Fischer et al. |
| 2010/0265559 A1 | | 10/2010 | Uchikawa et al. |
| 2011/0102565 A1 | | 5/2011 | Wang et al. |
| 2012/0093179 A1 | | 4/2012 | Dunn et al. |
| 2013/0088223 A1 | | 4/2013 | Konno et al. |
| 2014/0055844 A1 | | 2/2014 | Cormier et al. |
| 2014/0204382 A1 | | 7/2014 | Christensen |
| 2014/0254125 A1 | | 9/2014 | Nevitt et al. |
| 2014/0354275 A1 | | 12/2014 | Sheng et al. |
| 2014/0362378 A1 | | 12/2014 | Scarlett |
| 2015/0193207 A1 | | 7/2015 | Pooser |
| 2015/0323445 A1 | | 11/2015 | Rakitzis |
| 2016/0259625 A1 | | 9/2016 | Scarlett |
| 2018/0149584 A1 | * | 5/2018 | Scarlett ............... G01N 21/031 |
| 2018/0156718 A1 | * | 6/2018 | Fleisher ................ G01J 3/0208 |
| 2019/0302015 A1 | * | 10/2019 | Pate ....................... G01N 22/00 |
| 2021/0103160 A1 | * | 4/2021 | Dehkordi ............. G02B 5/3058 |
| 2022/0268699 A1 | * | 8/2022 | Pate ........................ H01J 23/20 |

FOREIGN PATENT DOCUMENTS

| | | |
|---|---|---|
| WO | WO-2005060056 A1 | 6/2005 |
| WO | WO-2005096115 A1 | 10/2005 |

OTHER PUBLICATIONS

European Patent Application No. 17875648, Extended European Search Report, dated May 28, 2020.
Cadène et al., "Faraday and Cotton-Mouton Effects of Helium at λ=1064 nm", Physical Review A, American Physical Society, 88: 1-13 (2013).
Cantatore et al., "Measurement of the Magnetic Birefringence of Neon Gas", Journal of the Optical Society of America B., 1-22 (1991).
Cao et al., "Mirrorless lasing in liquid crystalline materials", Proceedings of SPIE, 4642: 55-61 (2002).
Chauvat et al., "Cotton-Mouton effect measurement with the Fabry-Perot eigenstates", Applied Physics Letters, 73(8): 1032-1034 (1998).
Dong et al., "A generation method of tunable cylindrical vector ring beam", Optics and Lasers in Engineering 50, 1823-1827 (2012).
International Preliminary Report on Patentability for Inernational Application No. PCT/US2016/020702, dated Sep. 5, 2017.
International Search Report and Written Opinion, corresponding International Application No. PCT/US2017/063707, dated Feb. 6, 2018.
International Search Report and Written Opinion, International Application No. PCT/US16/20702, dated May 26, 2016.
Jackel et al., "Adaptive compensation of lower order thermal aberrations in concave-convex power oscillators under variable pump conditions", Society of Photo-Optical Instrumentation Engineers, 39(9): 2330-2337 (2000).
Khankhasayev, et al. "Photon-axion mixing effects and mirror cavity experiments," Physical Review, D 87:125030-1-125030-7 (2013).
Kielich, "Nonlinear Magnetoooptics of Colloids", Journal of Colloid and Interface Science, 30(2): 159-176 (1968).
Kucera et al., "Micropolarizers in Real Time Polariscope", EO & Laser Metrology Lab, Hochschule Pforzheim University, 1-4 (2011).
Matzakos et al., "New Laser-based Bistability System for Optical Computing Applications", Proceedings of SPIE, 3423: 209-211 (1998).
Oakberg et al., "A new instrument for measuring low level linear birefringence", CLEO 2000, 569 (2000).
Riza et al., "Programmable spectral interferometric microscopy", Review of Scientific Instruments 76, 033107: 1-10 (2005).
Scarlett, "Axion-photon coupling in the limit of photon statistics," Nuclear Instruments and Methods in Physics Research A 748:12-17 (2014).
Scarlett, "Beam shifting due to bifurcation in a cavity environment," Nuclear Instruments and Methods in Physics Research A, 735:115-119 (2014).
Scarlett, "Laser profile changes due to photon-axion induced beam splitting," Nuclear Instruments and Methods in Physics Research A, 722:49-54 (2013).

(56) References Cited

OTHER PUBLICATIONS

Sofikitis, et al. "Evanescent-wave and ambient chiral sensing by signal-reversing cavity ringdown polarimetry," Nature 514(79):76-79 (2014).
Subrahmanyan et al., "Simultaneous figuring and damage mitigation of optical surfaces", Proceedings of SPIE, 7132: 1-6 (2008).
Wilson et al., "A Simple Apparatus for the Measurement of the Cotton-Mouton Effect in Particulate Suspensions", IEEE Transactions on Magentics, 33(5): 4349-4358 (1997).
Zavattini et al., "Experimental observation of vacuum birefringence", Nuclear Physics B—Proceedings Supplements, 174: 233-236 (2007).

\* cited by examiner

CIRCULAR BIREFRINGENCE IDENTIFICATION OF MATERIALS

CROSS-REFERENCE TO RELATED APPLICATIONS

This application is a continuation of pending U.S. patent application Ser. No. 15/435,246, entitled "Circular Birefringence Identification of Materials," filed Feb. 16, 2017, which claims the priority benefit under 35 U.S.C. § 119(e) of U.S. Provisional Application No. 62/427,394, filed Nov. 29, 2016, entitled "Circular Birefringence Identification of Materials," the disclosures of each of which are incorporated herein by reference in their entirety.

FIELD OF THE DISCLOSURE

The present disclosure is generally related to a technique for identifying a birefringent material using an optical mirror cavity system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Observation of circular birefringence and selected absorption (circular dichroism) has been widely used to identify chiral (circularly polarizing) molecules. In many cases, these techniques are preferred over others such as MRI. In general, these techniques work by passing light through a sample once, after which the output beam is analyzed for evidence of induced helicity changes (linear beam converted to a circularly polarized beam) or selected absorption. These single-pass systems are often limited in sensitivity for several reasons. First, a large number of target particles is typically necessary for positive identification of a sample, which can be especially difficult when the sample has a low density (i.e., a gas). Second, because a large number of photons is also necessary for positive identification of a sample, an extremely luminous light source may be needed if one beam of light is passed through the sample once. Third, there are strict requirements on the detection scheme. Furthermore, all of these factors increase the time required to analyze a given sample and achieve a reliable level of identification.

Previous work to amplify an absorption signature of a birefringent medium using mirror cavities (i.e., using a mirror to cause a beam of light to pass through a birefringent sample multiple times for the purpose of better identifying the sample) has failed because each time a beam passes through a birefringent medium, the birefringent medium tends to undo any circular birefringence effect rather than enhance it. That is, a beam with an electromagnetic field that rotates clockwise traverses a birefringent medium differently than radiation that rotates counter-clockwise, i.e., resulting in a different rotation of polarization signature. When a mirror reflects a beam that has just traversed a birefringent medium back through the same birefringent medium, the rotation of polarization signature proceeds in the opposite direction effectively canceling the previously created effect. Therefore, because a mirror cavity incorporating a birefringent medium typically yields a diminishing rotational signature with each traversal of a beam of light through the cavity, mirror cavities have traditionally been ineffective for amplifying a circular birefringent signature through a birefringent medium.

SUMMARY

Provided are techniques for identifying a sample medium exhibiting circular birefringence or circular dichroism (selective absorption). These characteristics are utilized by the present techniques to identify constituent materials within the sample medium. The techniques use a mirror cavity system to amplify either process as the medium interacts with a passing beam of photons. In comparison to conventional techniques, including conventional techniques built on circular birefringence, the present techniques use rotation elements to maintain a "mixed quantum state" for the radiation within the system, thus enabling amplification of the overall effect with each traversal of the cavity and allowing for signal amplification.

The system utilizes a mirror cavity, an input light beam, a sample medium that exhibits circular birefringence or circular dichroism, and a pair of polarization rotation elements (e.g., quarter-wave plates or half-wave plates or other optically active elements that are internal to the cavity). The system may additionally utilize an external magnetic field to enhance the circular birefringence and/or circular dichroism of the sample medium. The radiation exiting the mirror cavity impinges on an analyzer that may consist of a polarization sheet before being observed by a photo receiver.

In some examples, an output beam propagates from an external light source (also termed a "beam source") and into the cavity, either through a partially reflecting mirror or through an opening in a mirror surface. The light source may include elements to select narrow bandwidths of radiation from a white light or may be composed of a series of narrow band LEDs. In some examples, the light source is controlled by a programmable controller of the system, for example, one or more processors programmed to selectively tune the center wavelengths of the output beam from the light source. In some examples, the light source is contained within the system itself and controlled by a programmable controller thereof.

Once in the cavity, the input beam will undergo a transformation via the quarter-wave or half-wave plate or other rotational elements before impinging on the sample medium. The sample medium either expresses circular birefringence or has such an effect induced by an external magnetic field applied only to the medium. The passing beam enters the sample medium where it divides into left and right circularly polarized light, due to the circular birefringence of the medium. The beam exits the medium and impinges on a second quarter-wave or half-wave plate or other rotational elements, where it experiences optical rotation once again. The beam exits the quarter-wave or half-wave plate or other rotational elements and impinges on a reflecting mirror, where the process of reflection takes it through the quarter-wave or half-wave plate or other rotational elements then back into the sample medium. The process repeats several to several hundred thousand times before the beam exits the cavity and impinges on a photodiode stage, where the beam will be evaluated for frequency response.

As the peak wavelength of the input beam is tuned over a wavelength range, the photodiode stage measures and records the frequency response of the output beam, thereby building a unique amplitude vs. wavelength signature for the sample material. This signature depends on the molecular makeup of the sample material. The sample material will alter beams of different wavelengths differently in response to molecular compositions in the sample. Example input beam wavelengths range from the ultraviolet to infrared range, (e.g., from 245 nm to 1600 nm). The input beam wavelengths may be over a portion of that range, e.g., over a visible spectrum from approximately 380 nm to 750 nm, over a near infrared spectrum from approximately 750 nm to 1.4 microns, or over a combination of the two. Moreover, by using a system configured to amplify signal outputs through a mixed quantum state cavity, the signature of even small concentrations of molecules can be detected over a sampling time period. This allows the system to achieve high sensitivity to even low concentrations of molecules on the order of 1-100 ppm depending on the number of cavity traversals and the quality of the rotational elements. As a result, the enhanced identification of materials exhibiting circular birefringence or circular dichroism may be used to better understand biological molecules and may be used in environments where rapid identification of organic materials is required. For example, present techniques have the sensitivity to identify even folding and rotating long chain molecules that exhibit circular birefringence.

In accordance with an example, an optical system for analyzing and identifying a circularly birefringent sample medium, comprises: an optical cavity formed by a first mirror and a second mirror, wherein the first mirror is configured to receive into the cavity a beam from a beam source, and wherein the first mirror and the second mirror are positioned to propagate the beam over a plurality of roundtrip traversals of the cavity; a circularly birefringent sample medium within the optical cavity, the circularly birefringent sample medium configured to receive the beam and temporally separate the beam into components with either clockwise or counter-clockwise rotating polarization states with each roundtrip traversal; a plurality of polarizer elements within the optical cavity configured to induce a change in the polarization state of the beam or the beam components; and a photodetector positioned to receive an exiting beam from the cavity after a threshold number of traversals of the beam and detect a signature of the circularly birefringent properties of the sample medium by measuring spectral response of the exiting beam.

DETAILED DESCRIPTION

The present technology utilizes induced circular birefringence and selected absorption of beam energy to generate a unique signature for molecular structures and enable identification of specific chiral molecules, long chain molecules, amino acids and proteins in a specific sample, e.g. sweat, saliva or breath of organisms. For example, of the often-referred to twenty common amino acids, nineteen are circularly birefringent. Deoxyribonucleic acid and other nucleic acids exhibit circular birefringence and circular dichroism.

Figure 1:
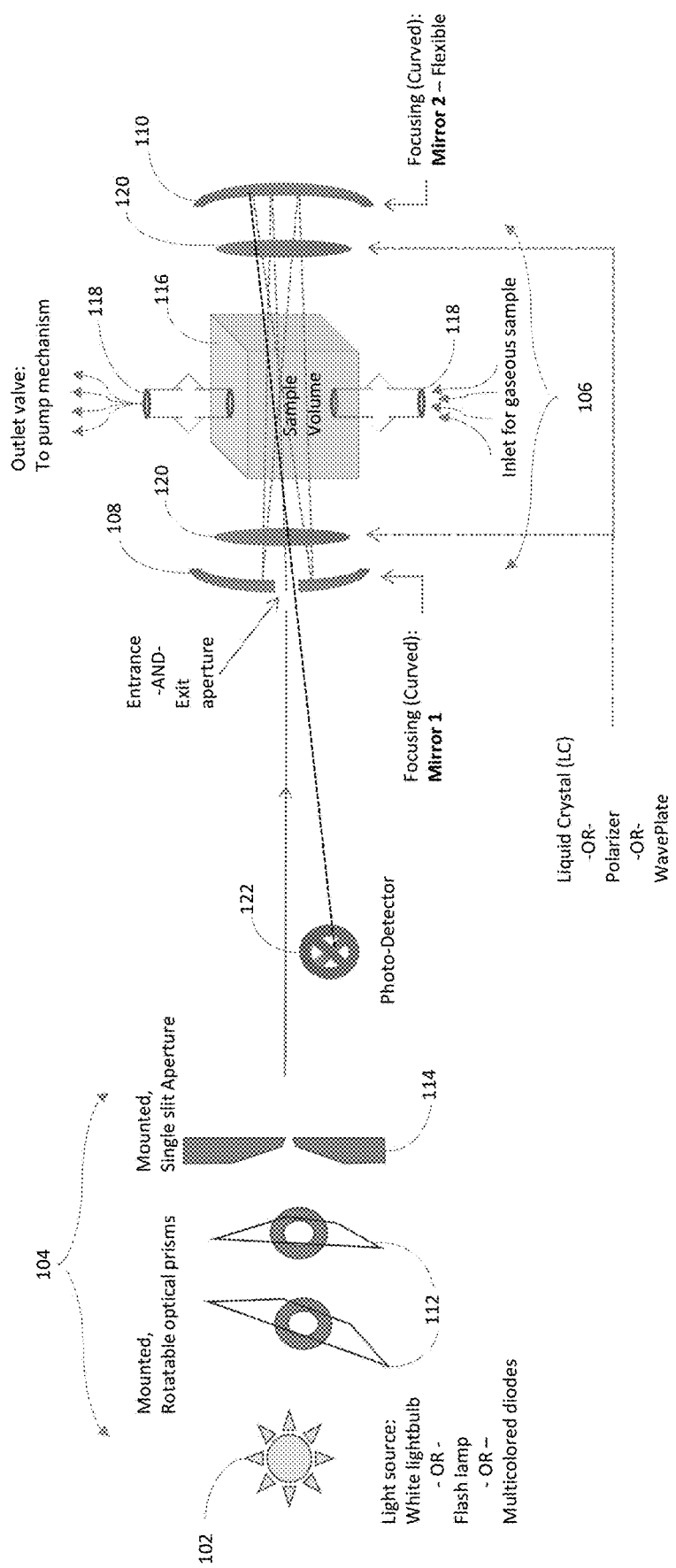
FIG. 1 is a schematic of an optical system for creating an enhanced circular birefringence or circular dichroism effect in accordance with an example.

FIG. 1 illustrates an optical system 100 having a beam source 102, a wavelength selector 104, and an optical cavity 106 defined by a first cavity mirror 108 and a second cavity mirror 110. The beam source 102 may be a non-coherent beam source such as, by way of example, an arc lamp, flashtube, electric spark, electrodeless lamp, excimer lamp, fluorescent lamp, high-intensity discharge lamp, hollow-cathode lamp, induction lighting, neon lamp, and argon lamp, plasma lamp, Xenon flash lamp, a bulb using various filaments or gases, and even sunlight. In other examples, including that illustrated, the beam source 102 may be a coherent beam source, such as a Diode laser, a VCSEL array, or a laser utilizing gas tubes, solid-state structures, fiber optics, photonic crystals, semiconductors, dyes, free-electrons or other exotic media, whether operated continuously (CW) or pulsed (q-switched, mode-locking or pulse pumping). The wavelength of the output from the beam source 102 may be tunable. In some examples, the beam source 102 is tunable. In other examples, the output beam is provided to a wavelength selection system, as described.

In the illustrated example, the beam source 102 produces a beam incident on the wavelength selection system 104. Using the wavelength selection system 104, various wavelengths of beam energy may be selected from the beam source 102 for introduction into the cavity 106. In this way, the radiation impinging on the cavity 106 may be varied, allowing selected various wavelengths of beam energy to enter the cavity 106 for subsequent measurements, which may help to distinguish materials that exhibit similar values of circular birefringence for some wavelengths of beam energy but not others. The wavelength selection system 104 may include a pair of prisms 112 and a mounted single slit aperture 114 which may provide a monochromatic beam into the cavity. For example, the pair of prisms 112 may divide a white light beam source roughly into colors (i.e., wavelengths) and then execute a more refined division of the output spectrum to narrow the beam wavelength event further (i.e., set of wavelengths included in the output radiation).

In some embodiments, the mounted single slit aperture 114 may be a system of single slits appropriate for each wavelength that may impinge from the pair of prisms 112. The slits may be of varying sizes, and may additionally or alternatively rotate along with the prisms 112. These single slits may be used to both collimate the beam from beam source 102 and, in the case of incoherent beam, to fan out the wave fronts before the radiation reaches the cavity 106. Once a narrow bandwidth has been selected using the pair of prisms 112, the beam may impinge on the mounted single slit aperture 114, pass through the slit, and enter the cavity 106. In some embodiments, the wavelength selection system 104 may be replaced with a mounted series of LEDs in various colors which may enter the cavity 106.

After passing through the mounted slit aperture 114, the beam, having a single peak wavelength, may be introduced into the cavity 106 through the first mirror 108, which may be partially transparent to external beams or which may have a bore hole (as shown), or which may be impinged upon as the beam makes a non-90° angle to the axis of the cavity 106. In some embodiments, the incident beam enters through an input bore hole in the first mirror 108 and exits from the cavity 106 through the same input bore hole. In other embodiments, the incident beam may exit through an exit bore hole in the mirror 110 on the opposite side of the cavity.

Within the cavity 106 is a sample medium 116, such as a gas or liquid introduced into the cavity through inlet/outlet valves 118 designed to "inhale" either gases or liquids to fill the sample volume for interrogation. In other examples, the sample medium 116 may be placed directly into the cavity in a container, such as a transparent tube. That is, some embodiments may not require inlet/outlet valves 118 but may rely instead on externally collected samples that are put into the volume. Additionally, in some embodiments, there may be a mechanism for flushing gases or liquids from the volume before operating on subsequent samples.

In some embodiments, the sample medium 116 may exhibit circular birefringence or circular dichroism. For example, the sample medium may be (or contain) a circular birefringent biological material, such as a circular birefringent amino acid or protein. However, the instrument may also be used to detect the absorption spectrum for materials that do not inherently exhibit circular birefringence, but in which circular birefringence has been created through external forces. For instance, in some embodiments, an external magnetic field with a helical configuration for the field direction may be used to stress the sample material into a more or less circular birefringent state.

In some examples, the observed changes in the input beam, induced by the circular birefringent sample, will be evaluated for frequency response across wavelengths and, in some examples, for the input beam changes in response to modulation induced by an external magnetic field applied to the sample. In other words, the magnetic field will be modulated and a signal in/out of phase with the modulation will be searched for. The signal may be observed as a loss of beam energy or an induced decoherence if the input radiation or even a rotation of the direction of polarization for a beam from certain LED or laser sources. The changes in observed intensity as a function of incoming beam wavelength will be correlated with the material comprising the sample, and in this way, the sample may be identified.

For example, the composition of a sample medium can be identified by probing the sample with an input beam having a wavelength that is tuned across an entire spectral region and then examining the output beam from the system across that entire spectrum, for evidence of either circular dichroism or circular birefringence, as a function of input wavelength. Once either are detected, then the output beam spectral response as a functional of input wavelength can be examined to find key combinations of frequencies that indicate the presence of distinct materials, similar to identifying atoms from spectral absorption lines, examined by looking at the relative effects, degree of absorption/rotation for a given frequency, at different frequencies in cases where multiple structures may contribute at a single frequency value.

The sample medium 116 may be characterized by circular birefringence whereby passing radiation with an electromagnetic field that rotates clockwise traverses the medium differently than radiation that rotates counter-clockwise. The sample medium 116 may have distinct refractive indices for radiation that rotates in the two directions. The refractive index may also be a function of the wavelength for the input radiation, necessitating the use of multiple wavelengths, as discussed above with respect to the wavelength selection system 104. Moreover, the sample medium 116 may also exhibit circular dichroism (also known as selected absorption). In this case, radiation of one type of circular rotation (clockwise versus counter-clockwise) is more readily absorbed than radiation of the other type of rotation. Such effects may also be amplified in a cavity environment such as cavity 106.

The sample medium 116 may be positioned between two polarizer elements (plates) 120, which may have polarization axes that are aligned with one another, orthogonal to one another, or angled with respect to one another. These polarization elements 120 may include linear or circular polarizers or other elements inducing polarization changes, including waveplates or any other partially transparent and polarizing materials. In some examples, the polarizer plates 120 are waveplates that provide partial polarization state rotation as beams traverse the cavity 106. In other examples, these polarizers 120 are rotatable elements, including, for example, electrically rotatable liquid crystal plates. That is, the polarization axes of the polarizer plates 120 may be fixed during operation, while in other examples, the polarizer plates 120 may rotate during operation such that their polarization axes change. In some examples, the polarization axis may be fixed relative to the cavity 106, or each element 120 may rotate at a different speed relative to the other element 120. The rotation of polarization during operation may be used to modulate the output radiation, thereby overlaying the modulated pattern on the output spectrum. In embodiments, this modulation may be used in the calibration of the system to ensure proper functioning. The rate of change of the polarization rates in the elements 120 may be determined in a number of ways. For example, the polarization rates may be determined by the concentrations of the optically active (circularly birefringent) materials in the sample medium. Where multiple active materials are present, a large illumination spectrum may be desired to detangle the relative concentrations of active materials in the sample medium.

Although not shown, in some examples, the cavity 106 may further contain elements such as: a photon-detector embedded at some position along one of the mirror surfaces, nematic crystal gel along the surface of the birefringent material that may be used to imprint information through altering the polarization of some or all of the photons in the beam, or any other materials that focus or refract the beam before it is allowed to exit the cavity. These elements could be combined into layers, as a single material consisting of a central birefringent material with outer layers of polarization rotators or focusing elements, or held separately in place through a mechanical structure.

Figure 3:
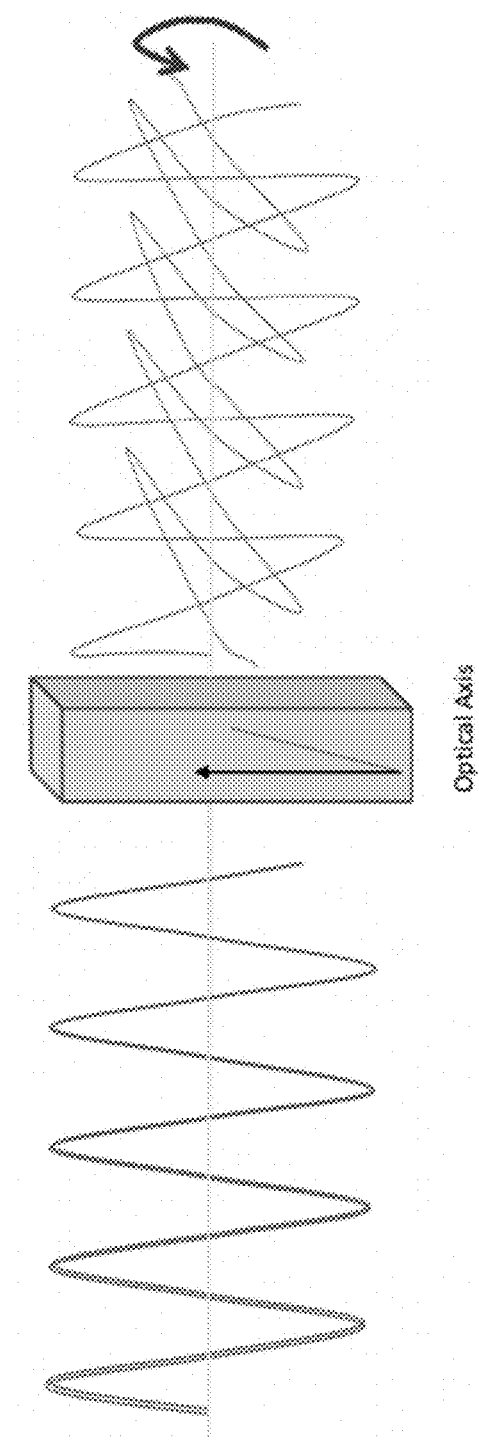
FIG. 3 illustrates the effects of a circular birefringent sample medium on an input beam, in accordance with an example. The input beam is separated into two outgoing wave components that may overlap in space, but are separated in time, i.e., phase.
Figure 4A:
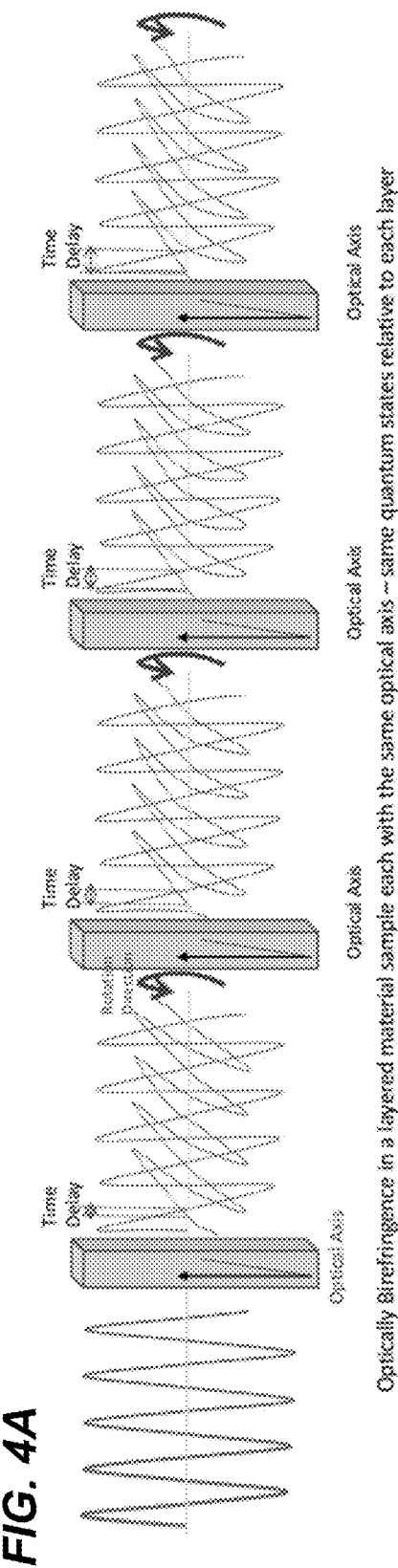
FIG. 4A illustrates the progression of an input beam over multiple layers of a sample medium, each layer characterized by the same optical axis orientation (i.e., the beam is in the same state relative to the medium as it progresses through each layer).
Figure 4B:
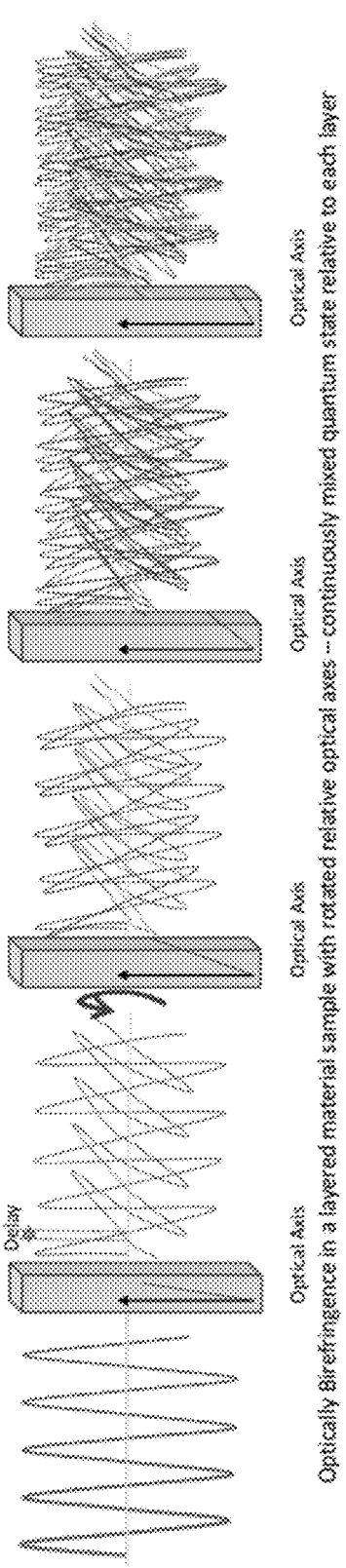
FIG. 4B illustrates the progression of an input beam over multiple layers of a sample medium, each layer characterized by a rotated circular birefringent optical axis orientation, resulting in a continuously mixed quantum state relative to the medium as the beam progresses through each layer.

In operation, the mirrors 108, 110 form a reflective cavity that forces the incoming beam to interact repeatedly with the enclosed sample medium 116. As such, the cavity 106 may be configured as an optical delay or Fabry-Perot cavity, depending primarily on the degree of birefringence of the central medium 116. The sample medium 116 differentially rotates components of the input beam, inducing a phase shift in different components, as shown in FIG. 3. The polarization plates 120 rotate the polarization of the beam, with beam components, after the beam passes through the sample medium 116. This rotation puts the beams emerging from the sample medium 116 in a "mixed-quantum" state relative to the materials in the sample medium 116 such that temporal separations of the energy of the beam occur with each traversal of the cavity 106, as shown in FIGS. 4A and 4B. That is, the polarization plates 120 may have a polarization axis that is at an angle with respect to a y-axis that is orthogonal to the cavity axis.

FIG. 3 illustrates the splitting in time, i.e., phase, that happens to an input beam in response to the passing through a circular birefringent (or circular dichroic) sample medium. The input beam is divided in time into different phase components, one propagating slightly faster than the other. In some materials, a linear birefringence may also be present such that the material may divide components spatially, causing the components to exit the sample medium at different distinct angles. Some spatial separation may even result from refractive effects in the sample medium, although the separation would be minimal in comparison to the temporal separation from the circular birefringence.

FIG. 4A illustrates the progression of an input beam through a sample medium, where the same relative circular birefringence orientation (i.e., relative optical axis) is experienced each layer, resulting in the same relative quantum effect. In an arbitrary sample, this mechanism would enhance the overall signature. But, for circular birefringent materials, as with each return trip in a cavity, the material axes are reversed and the circular birefringent effect is diminished. FIG. 4B, however, illustrates the progression of an input beam through a sample medium, where the relative circular birefringence orientation is rotated each layer, resulting in a mixed quantum state relative to the sample medium. In this case, the return trip does not diminish the effect, but enhances it due to the fact that each layer leads to alterations of the energy distribution of the beam.

The input beam exiting the sample medium 116 each traversal (see, e.g., FIGS. 3 and 4B) will have been temporally separated into components with either clockwise or counter-clockwise rotating polarization states. Depending on the angle of the polarization axes for the polarization plates 120, the beam components will separate further with each traversal through the sample medium 116. Therefore, this process enhances the measurable circular birefringence of the sample medium 116. Moreover, the circular dichroism of the sample medium 116 may also be enhanced, as one component of the radiation is repeatedly absorbed with each traversal of the medium 116. For configurations like that of FIGS. 1 and 2, where the polarization axes of the plates 120 are rotated relative to the polarization axis of the outgoing beam components before each traversal, the beam energy is split along the direction of travel for each one-way traversal of the cavity 106 (i.e., twice each round trip). However, for configurations in which one of the polarization axes of the plates 120 is held constant along a 45° angle relative to one of the polarization axes of a beam component, the splitting will occur once each round trip. Furthermore, the amount of splitting in a round trip can be adjusted from one traversal to the next by controlling operation of the polarizers or of the polarization rotators, e.g., by connecting the liquid crystal rotation elements to a variable voltage supply.

Figure 2:
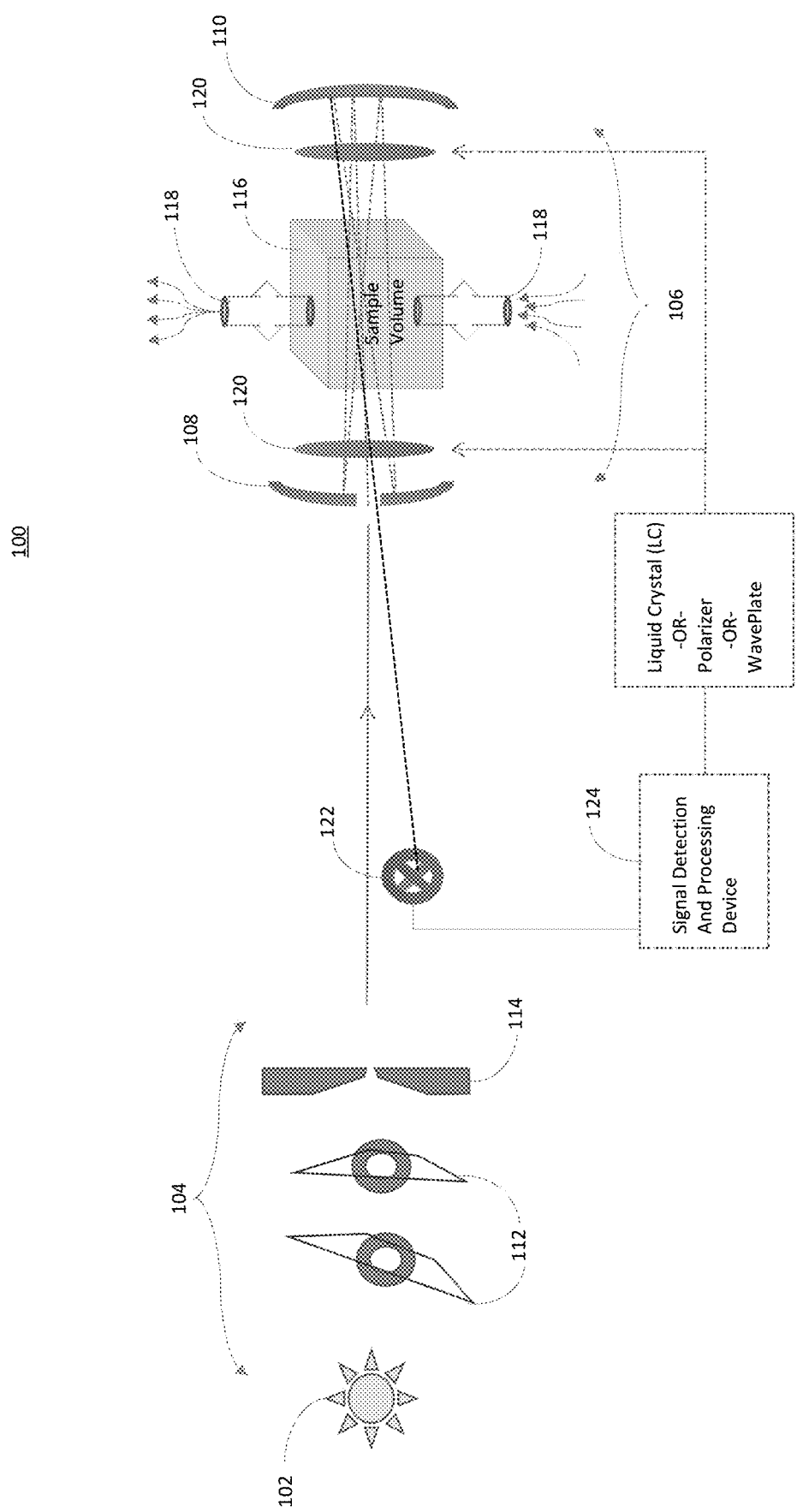
FIG. 2 is a schematic of another optical system for enhancing optical birefringence of a molecular sample into an observable effect, in accordance with another example.
Figure 7:
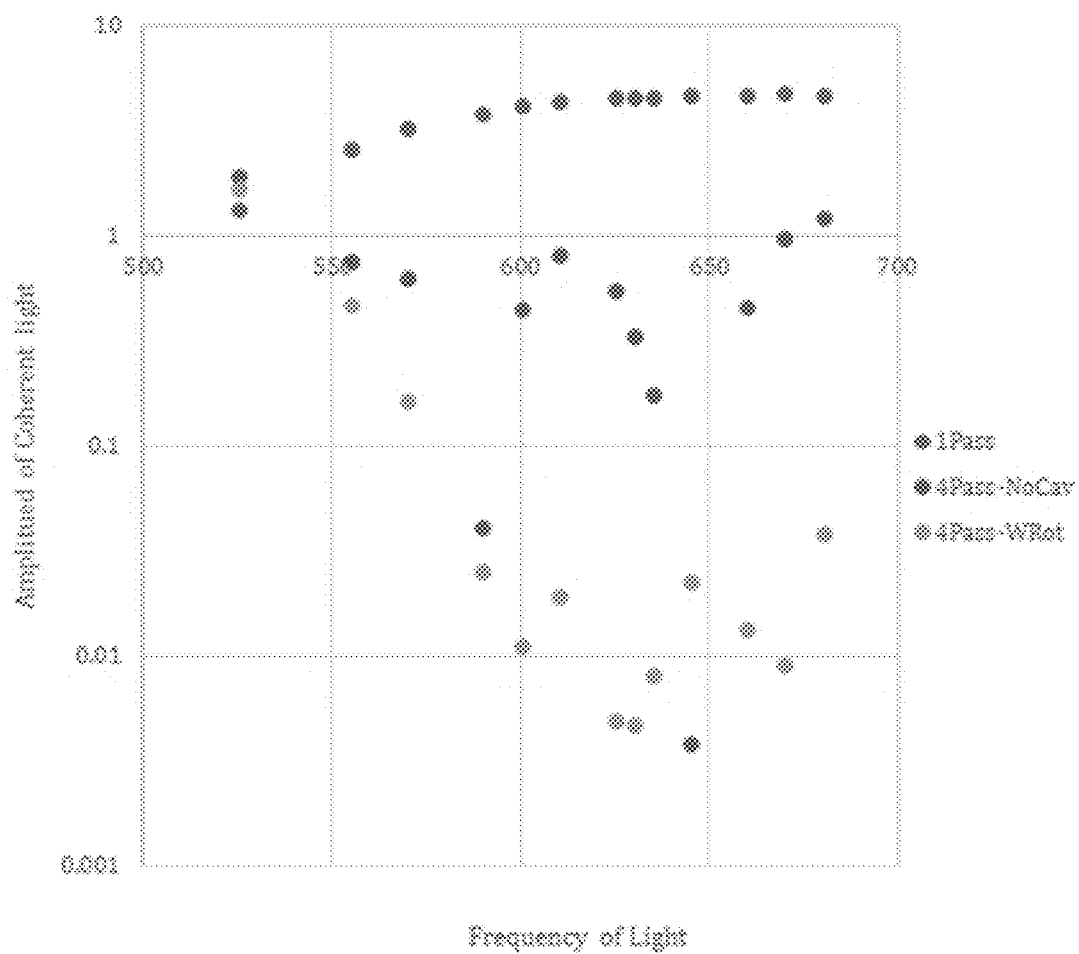
FIG. 7 shows the birefringent signals expected from a single pass system, a multi-pass system, and a multi-pass system with rotational elements to create a continuously mixed quantum state.

As shown in FIG. 4B, with each layer, the energy of the initial beam is subdivided (bifurcated) in a manner that adds positively. This is distinct from other attempts to measure circular birefringence in a cavity environment, where the circular birefringent effect is essentially done and then undone with each layer (see, e.g., FIG. 4A). After a certain number of passes through the cavity, the birefringent properties of the sample medium 116 can be accurately measured and imprinted on an exiting beam. The exiting beam exits the cavity either through a bore hole in one of the mirrors 108 or 110 in embodiments where curved mirrors are used, or along the edge of either mirror in embodiments incorporating flat mirrors, and impinges on a photodetector 122, such as, for example, an analyzer or polarization plate for detecting two waves shifted in time relative to one another. In some embodiments, other elements such an exit aperture may be used for collimation or to refine the exiting wave front. In some embodiments, the photodetector 122 may further transmit measurements or analysis to a signal detection and processing device 124 (as shown in FIG. 2). The signal detection and processing device 124 includes one or more processors and one or more memories storing instructions executable by the one or more processors to analyze the output beams from the system 100 and identify materials in the sample medium 116, in accordance with examples discussed herein. The processing device 124 may include, or be networked to communicate with, a database (not shown) storing different spectral signature profiles for different circularly birefringent materials (such as the profile shown in FIG. 7). The database may store spectral the spectral response signatures for any number of circularly birefringent materials, including biological materials. Example materials include specific chiral molecules, long chain molecules, amino acids and proteins (e.g., those contained in sweat, saliva or breath of organisms). The processing device 124 collects output beam response data from the photodetector 122 and builds the spectral response signature across the range of wavelengths on the input beam. From there the processing device 124 compares that spectral response to those stored in the database to identify one or more matching materials. In some examples, the processing device 124 may also control tuning of the input beam across the range of wavelengths to be examined in identifying materials within the sample medium 116. In some examples, the photodetector 122 includes one or more processors and one or more memories to perform the analysis and identification. The other processing devices described herein would include similar components and provide similar functionality.

The intensity of the beam exiting the cavity and impinging on a photodetector 122 will therefore display a unique signature representative of the molecules composing the sample 116, as the input beam is tuned across different wavelengths. In some embodiments, absent circular dichroism to destroy specific wavelengths of the beam entering the cavity, bifurcation leading to a unique noise may occur, which may also be representative of the sample 116. In some implementations, e.g., for a high finesse cavity, the circular birefringence may lead to a randomization effect that can also be measured and may be an additional or alternative indicator of the degree of birefringence for the sample 116.

Once the circular birefringence has been measured for a single wavelength for the input beam, the prism system 112 may be rotated to tune the wavelength of the beam to a new wavelength, from which the beam is passed through the aperture 114. This process may be continued to probe the sample across a range of wavelengths, to develop a characteristic signature of the sample. That is, the new wavelength may then probe the sample volume 116 such that the birefringent properties of the sample may be mapped out as a function of the impinging beam's wavelength (see, e.g., FIG. 7). The varied wavelength dependent intensity of beam mapped for a sample indicates the molecular makeup of the sample. The use of various wavelengths for the beam is important to distinguish materials that may exhibit similar values of circular birefringence for some wavelengths but not others. In some examples, the wavelength of the beam source 102 is tuned across a range from 245 nm to 1600 nm to develop the signature profile. In some examples the tuning wavelength is small, e.g., from 450 nm to 690 nm, and sufficient information is typically captured to provide a suitable sample signature. The input beam source 102 may be a series of different colored LEDs or laser diodes, in which case turning may be achieved without using either the prisms 112 or the aperture 114.

In other words, optical system 100 is an example of a technique to enhance circular birefringence within a cavity environment. Furthermore, system 100 is also appropriate for measuring circular dichroism. In the present techniques, the continuous rotation of the beam within a cavity, wherein polarization of the beam is rotated each traversal and in such a manner that temporal beam separation occurs continuously within the cavity, amplifying an output signal which may be used to measure circular birefringence. Additionally or alternatively, the randomization of the final output energy provides another signature of the properties for the sample volume 116 and could be observed for a design having more than a specific number of traversals through the sample determined by the numbers of input photons.

Figure 5:
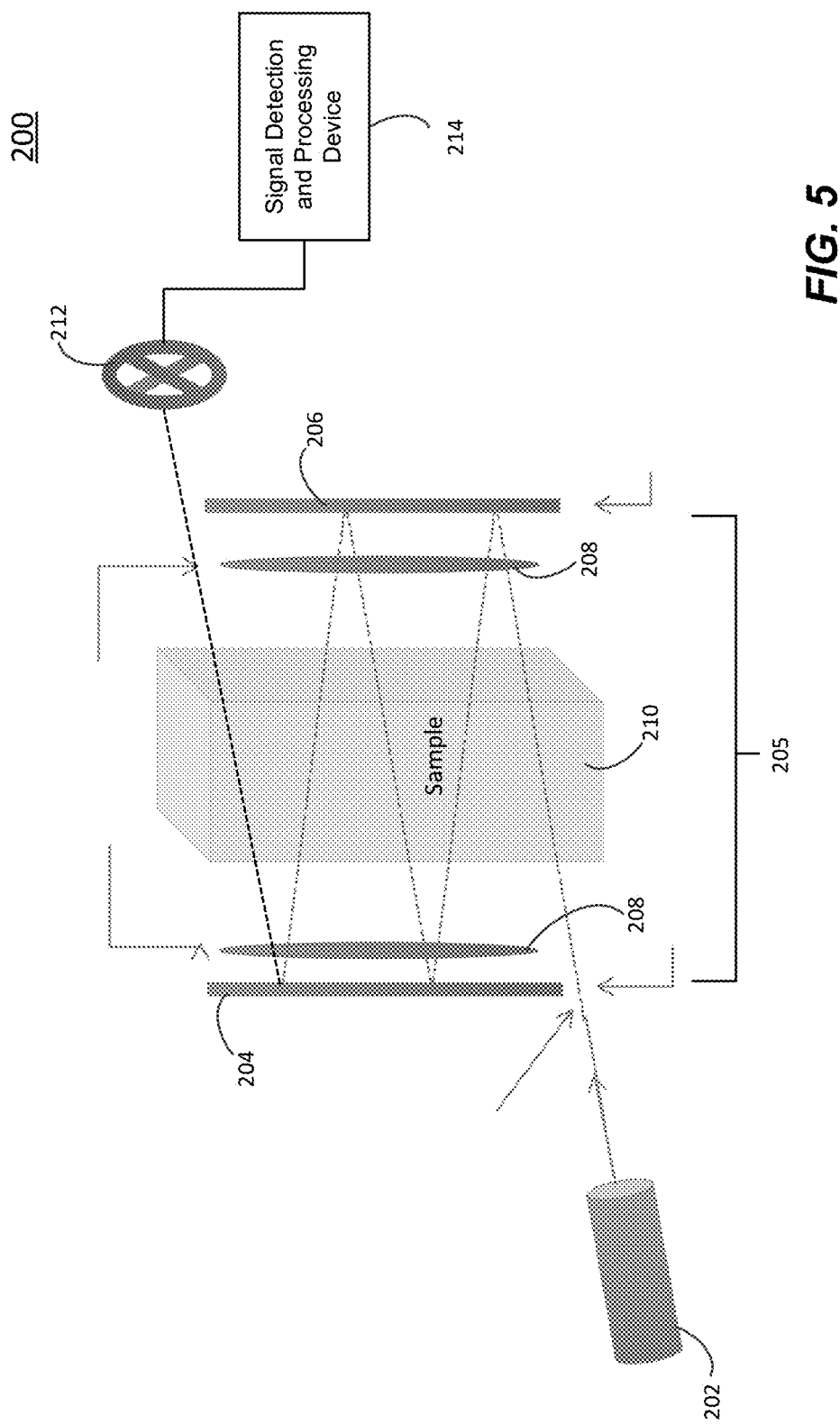
FIG. 5 is a schematic of an optical system for enhancing circular birefringence and circular dichroism using flat mirrors, in accordance with an example.
Figure 6:
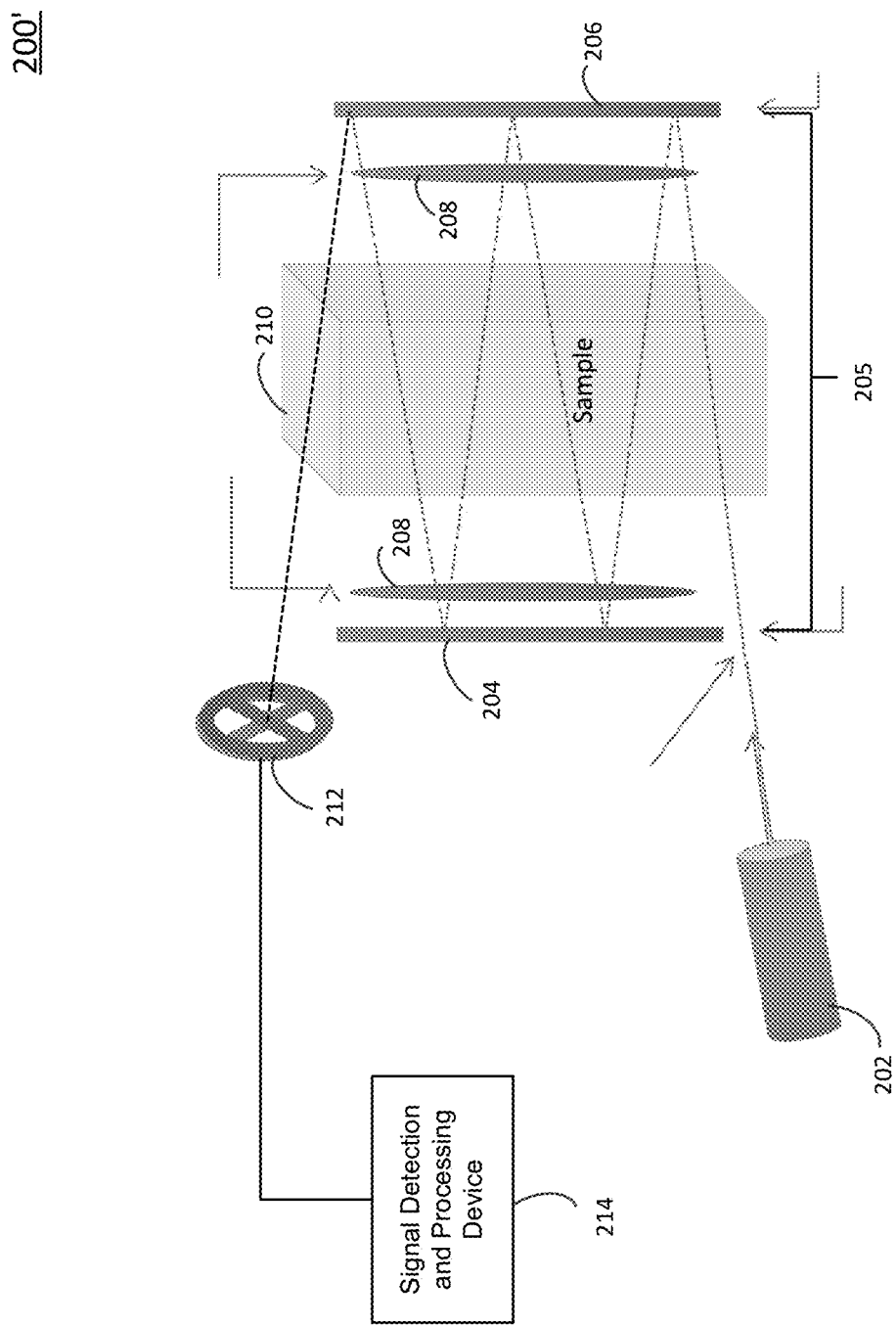
FIG. 6 is a schematic of another optical system for enhancing circular birefringence and circular dichroism using flat mirrors, in accordance with another example.

FIGS. 5 and 6 illustrate other example configurations of an optical system for generating randomization. In the optical system 200 of FIG. 5, a beam source 102 provides the incident beam from an angle and from outside an outer edge of a first cavity mirror 204, which is flat and which defines a cavity 205 with a second cavity mirror 206, which is also flat, and parallel to the first mirror 204. Two polarization plates 208 are provided surrounding a birefringent medium 210. The plates 208, like the plates 112, may be polarizers or waveplates or liquid crystal plates or any other suitable polarizer, with fixed or rotatable polarization axes. These polarizers may be linear polarizers, although in other examples, they may be circular polarizers. For cavities formed of the flat mirrors 204, 206, the beam will simply walk out of the cavity due to the geometry. The beam enters at a non-90° angle at the bottom left of the cavity then after some number of traversals exits from the top left, then the beam impinges onto a photodetector 212 connected to a signal processing device 214, similar to the processing device 124. FIG. 5 shows the optical system 200 with the photodetector 212 on one side of the system. FIG. 6 shows the photodetector 212 on the other side (and is thus labeled 200').

As discussed briefly above, in some examples, the polarization axes of the polarizer elements may be electrically (or mechanically) controlled to rotate during operation; the axes may even be oscillated. For example, liquid crystal rotators may be used as the polarization plates 120. These liquid crystal rotators can be held fixed in polarization orientation. However, in other examples, an applied voltage may be used to alter the polarization axis of the elements providing further control over the beam splitting within the cavity. FIG. 1 shows an example implementation, with an optional waveform generator and voltage controller 120 controlled by the signal detection and processing device 124 to send a modulated voltage signal to control rotation of the polarizer elements 120. With such a configuration, the applied voltage may be sinusoidally increased or decreased, using a perturbation signal applied to a control voltage, to produce a change in the degree of polarization rotation. The amount of rotation, the rate of rotation, and the modulation waveform, may all be controlled depending on the characteristics of the optical cavity, the cavity roundtrip time, the current number of traversals, the threshold number of traversals needed for accurate measurement of the birefringent properties of the medium, and any other suitable physical factors. In any event, even in examples in which a polarization plate or waveplate is used, these elements may be mounted on mounting stages that can rotate the polarizer elements thereby adjusting their orientation. Such mechanical rotation may be by hand or be electrical control over the mounting stages. In examples such as these, where the actual polarization orientation of the polarizer elements is adjusted, the adjustment may occur continuously or periodically, and in a timed manner depending on the roundtrip times of the cavity, the amount of birefringence, and other factors.

Figure 8:
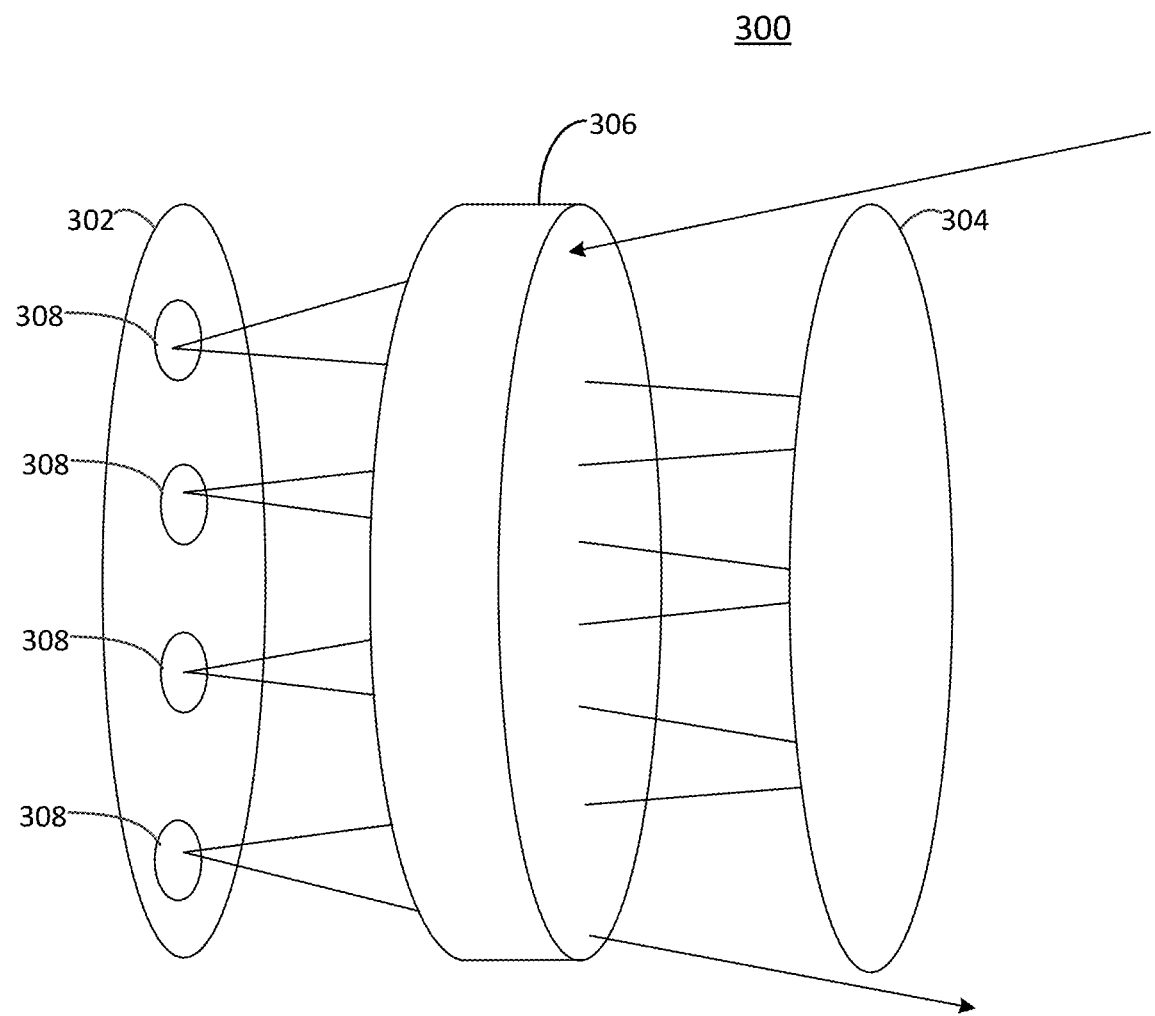
FIG. 8 is a schematic of a birefringent medium and optical cavity formed using segmented polarizers, quarter-wave plates or other optical polarization rotators, in accordance with an example.

Polarization rotators may be achieved as a single pair of rotators on either side of the birefringent medium, as in the configurations of FIGS. 1 and 2, or they may be separated into several segments that intercept the beam's path through the cavity, as shown in FIG. 8, which illustrates an example implementation 300 of segment polarization rotators. Two flat mirrors 302, 304 surround a birefringent medium 306. Traversing the surface of at least one of the mirrors is a plurality of polarization rotators segments 308 (only a representative number of which are shown), each one positioned to interact with an incident beam corresponding to a particular traversal of the cavity between the two mirrors 302, 304. Each traversal would experience a polarization rotator segment as the beam walks up the diameter of the mirrors. Depending on the geometry, some beams may impinge upon the same polarization rotator 308 over multiple traversals before graduating sufficiently transversely to the next polarization rotator segment 308. In the segmented approach, each polarization rotator segment 308 may operate the same producing the same polarization rotation, or each may be individually controlled. The size of the segments 308 can be set based on the beam shape and width and number of traversals needed for the properties of the birefringent medium to be accurately measured and imprinted on the optical beam. Implemented as liquid crystals or otherwise, the segments 308 may be mounted to a mechanical structure that spaces the segments to maximize incidence of the beam spot in the center of the segment, and as may be determined by the incident angle. While not shown, matching pairs of segments may be formed for the mirror 304, as well.

Figure 9:
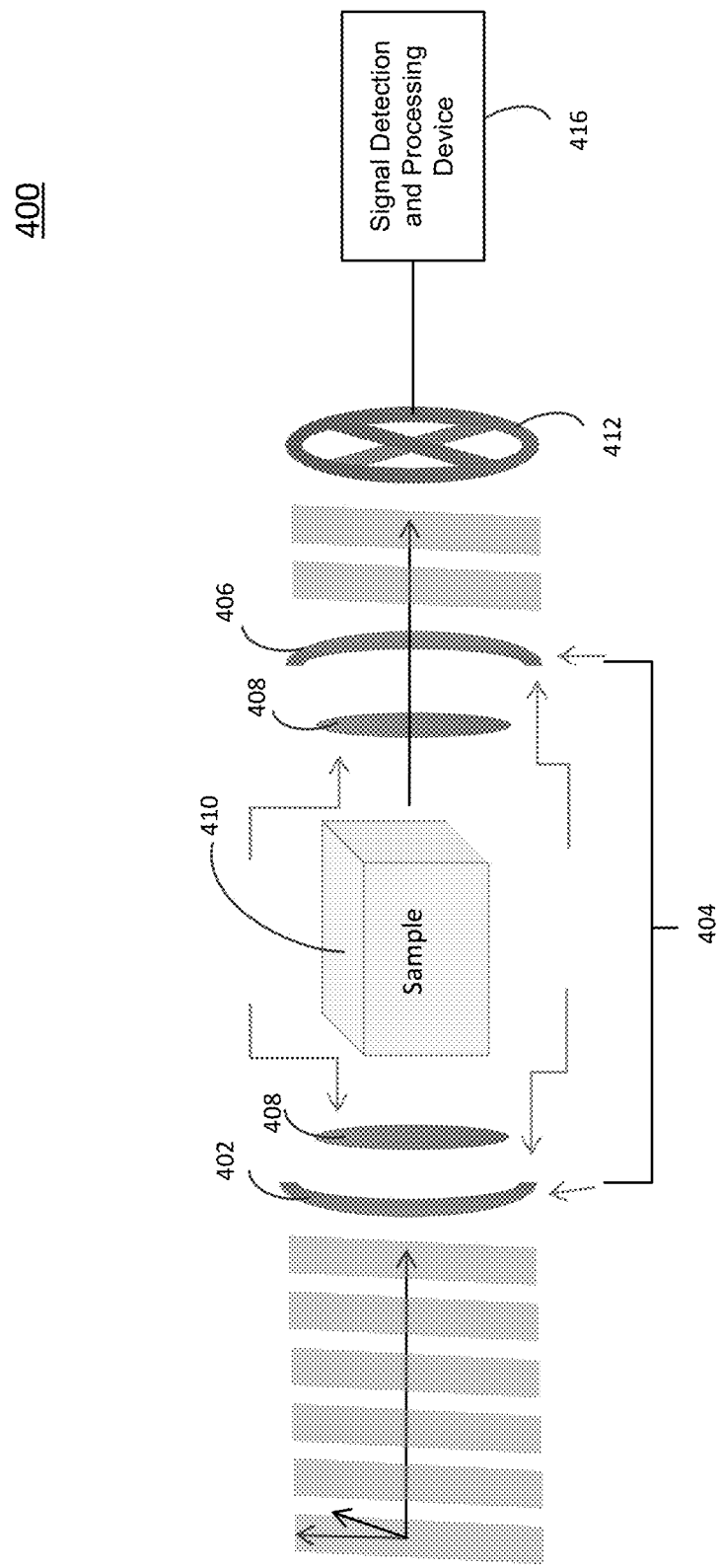
FIG. 9 illustrates an optical system for enhancing circular birefringence and circular dichroism using a Fabry-Perot configuration, in accordance with an example.

FIG. 9 illustrates another optical system 400 that is in a Fabry-Perot configuration. An input beam (from a beam source not shown, such as beam source 102, which may or may not have already passed through a wavelength selector such as wavelength selector 104) impinges on a first focusing mirror 402 which is partially reflective and which forms a cavity 404 with a second partially reflective mirror 406. Thus, the input beam is introduced into the cavity 404 through the partial reflectivity of a mirror and not through a bore hole. The same is true of the generated energy and how it exits. In the illustrated example, the reflectivity of the mirror 402 may be substantially higher than the reflectivity of the mirror 406. Polarizer plates 408 are shown on opposite sides of a birefringent sample 410. The energy output is provided to a photodetector 412 coupled to a signal detection and processing device 416.

Figure 10:
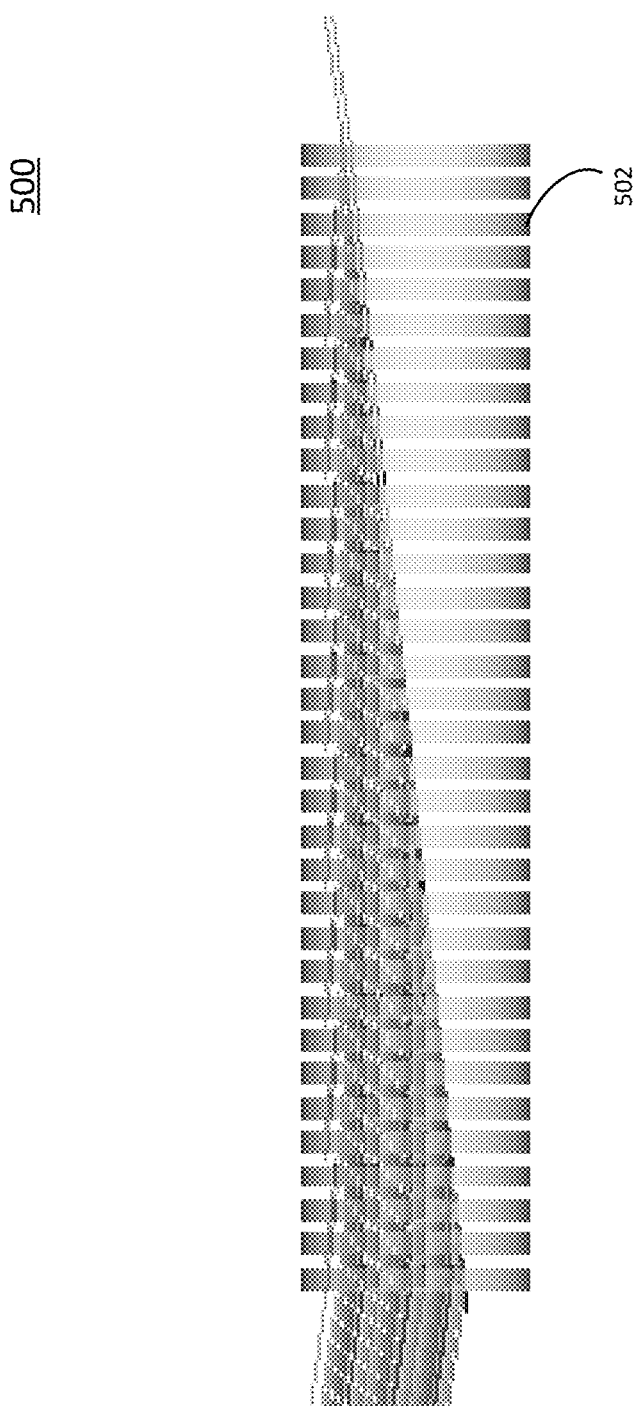
FIG. 10 illustrates a single pass, optical system with consecutive elements with each layer having rotated polarization relative to the previous layer, appropriate for magnetically induced circular birefringent effects, in accordance with an example.

In other examples, the cavity configuration is replaced with a multi-layered birefringent structure to create a single pass optical system, with each consecutive layer having rotated polarization relative to the previous layer as shown in FIG. 10. In the system 500, a birefringent structure 502 is formed of a plurality of abutting layers, each subsequent layer having a birefringent axis that is miss-aligned with the previous incident layer. In such a configuration, a beam will undergo a similar splitting each surface, followed by a rotated state relative to the next layer such that further splitting at the next layer will occur, and eventually bifurcation occurs from the structure. For the layered system 500 to produce bifurcation sufficient to allow for the identification of the birefringent medium, the layering of the structure 502 may further include a large scale liquid crystal or other controlled polarizer embedded in the layers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:
1. An optical system for analyzing and identifying a circularly birefringent sample medium, comprising:
an optical cavity formed by a first mirror and a second mirror, wherein the first mirror is configured to receive into the cavity a beam from a beam source, and wherein the first mirror and the second mirror are positioned to propagate the beam over a plurality of roundtrip traversals of the cavity;
a circularly birefringent sample medium within the optical cavity, the circularly birefringent sample medium configured to receive the beam and temporally separate the beam into components with either clockwise or counter-clockwise rotating polarization states with each roundtrip traversal;
two quarter-wave or half-wave plates positioned within the optical cavity, one of the two quarter-wave or half-wave plates being positioned between the first mirror and the circularly birefringent sample medium within the optical cavity, and the other of the two quarter-wave or half-wave plates being positioned between the second mirror and the circularly birefringent sample medium within the optical cavity, the quarter-wave or half-wave plates configured to induce a change in the polarization state of the beam or the beam components;
a photodetector positioned to receive an exiting beam from the cavity after a threshold number of traversals of the beam and detect a signature of the circularly birefringent properties of the sample medium by measuring spectral response of the exiting beam; and
a signal processing device, having one or more processors and one or more memories, and configured (i) to analyze the exiting beam from the optical cavity over a range of beam wavelengths and (ii) to identify a biological material in the sample medium based on a signature of circularly birefringent properties of the sample medium.

2. The optical system of claim 1, further comprising:
a wavelength selector, comprising a pair of prisms and a single slit aperture, placed between the beam source and the cavity entrance;
wherein the pair of prisms are configured to:
receive the beam from the beam source, and
rotate to allow a particular wavelength of light from the beam to impinge on the mounted aperture and subsequently enter the cavity; and
wherein the spectral response of the exiting beam is measured as a function of wavelength.

3. The optical system of claim 1, wherein the beam source is narrow band LEDs, each configured to emit a particular wavelength, and wherein the spectral response of the beam is measured as a function of wavelength.

4. The optical system of claim 1, wherein the beam source is a tunable beam source configured to produce the beam over a range of wavelengths.

5. The optical system of claim 4, wherein the range of wavelengths is from 245 nm to 1600 nm.

6. The optical system of claim 4, wherein the range of wavelengths is from 380 nm to 1.4 microns.

7. The optical system of claim 1, wherein the signal processing device is configured to identify the biological-material by comparing the signature to a database of stored signatures for different circularly birefringent biological materials.

8. The optical system of claim 1, wherein the circular birefringence of the sample medium is induced by an external magnetic field applied only to the sample medium.

9. The optical system of claim 1, wherein the first mirror and the second mirror are both curved mirrors.

10. The optical system of claim 1, wherein the first mirror and the second mirror are both flat mirrors.

11. The optical system of claim 1, wherein the first mirror is highly reflective and the second mirror is partially reflective.

12. The optical system of claim 1, wherein the first mirror has an entrance hole for receiving the beam from the beam source, and wherein the second mirror has an exit hole for producing the energy to the photodetector.

* * * * *

UNITED STATES PATENT AND TRADEMARK OFFICE
CERTIFICATE OF CORRECTION

PATENT NO. : 11,933,718 B2
APPLICATION NO. : 16/687319
DATED : March 19, 2024
INVENTOR(S) : Carol Y. Scarlett It is certified that error appears in the above-identified patent and that said Letters Patent is hereby corrected as shown below:

On the Title Page

Item (57), Line 5, "each" should be -- in each --.

Item (57), Lines 9-10, "the materials" should be -- materials --.

Signed and Sealed this
Eighth Day of October, 2024

Katherine Kelly Vidal
*Director of the United States Patent and Trademark Office*